May 8, 1956
O. H. SAHMEL
2,745,051
BATTERY-CAPACITOR CARTRIDGE
FOR PHOTOGRAPHIC FLASH UNIT
Filed Jan. 21, 1955
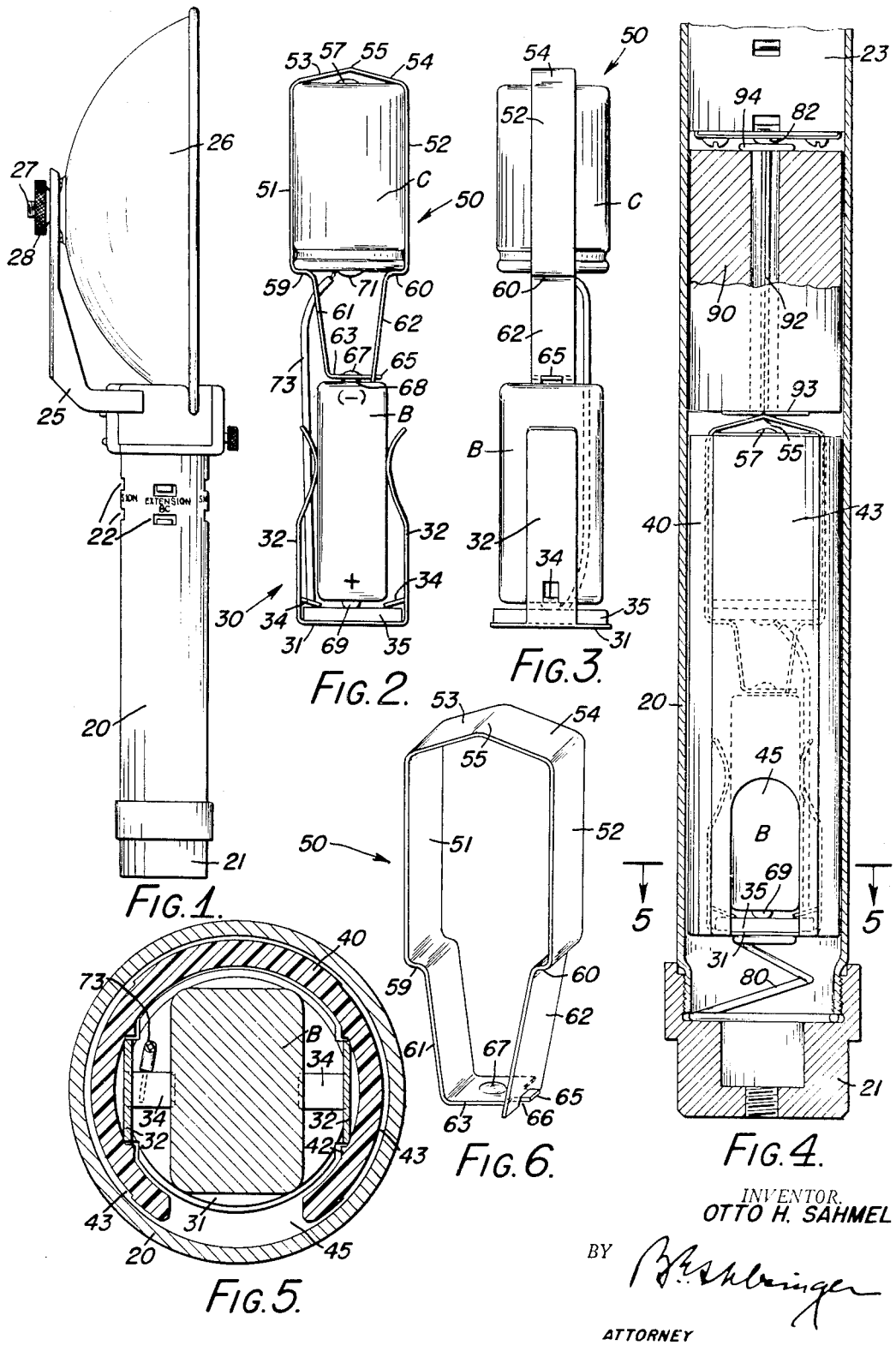
INVENTOR.
OTTO H. SAHMEL
BY
ATTORNEY United States Patent Office 2,745,051
Patented May 8, 1956

2,745,051

BATTERY-CAPACITOR CARTRIDGE FOR PHOTOGRAPHIC FLASH UNIT

Otto H. Sahmel, Rochester, N. Y., assignor to Graflex, Inc., Rochester, N. Y., a corporation of Delaware Application January 21, 1955, Serial No. 483,383

5 Claims. (Cl. 320—1)

The present invention relates to a power-cartridge for use in a flashlamp battery case of a photographic camera.

The conventional photographic flashlamp battery case is made to receive two or more standard, cylindrical dry-cell batteries. Because of their compactness and much greater power the flat, rectangular cross-sectioned batteries, such as are used in hearing aids, are coming more and more into use for powering photographic flashlamps. These are ordinarily used with capacitors.

One object of the present invention is to provide a removable cartridge for holding a battery and capacitor securely in a flashlamp battery case.

Another object of the invention is to provide a removable cartridge, which may be used in a conventional flashlamp battery case in place of conventional batteries without alteration of the case, and which holds a battery and a capacitor for supplying the power for firing the flashlamp.

Another object of the invention is to provide a battery-capacitor cartridge, which will be simple in construction and reasonable in price.

Still another object of the invention is to provide a battery-capacitor cartridge with which batteries can be changed quickly and readily.

Other objects of the invention will be apparent hereinafter from the specification and from the recital of the appended claims.

In the drawing:

Fig. 1 is a side elevation of a conventional combined flashlamp holder and battery case;

Fig. 2 is a side view showing the assembled battery and capacitor holders of a BC cartridge constructed according to one embodiment of the present invention;

Fig. 3 is a side elevation at right angles to Fig. 2, again showing these assembled elements of the cartridge;

Fig. 4 is a fragmentary axial section on an enlarged scale of a conventional type photographic flashlamp battery case showing assembled therein the BC cartridge of the present invention;

Fig. 5 is a section on an enlarged scale taken on the line 5—5 of Fig. 4 looking in the direction of the arrows; and Fig. 6 is a perspective view of the capacitor carrier of the cartridge.

Referring now to the drawings by numerals of reference, 20 denotes a conventional flashlamp battery case, such as that disclosed, for instance, in the U. S. patent application of Milford B. Moore, Serial No. 423,750, filed April 16, 1954. This case is closed at its bottom by a conventional cap 21 that threads onto the case. The battery case has outlet openings 22 around its periphery to receive the prongs of the terminal plug of a conventional electrical extension cord for a side lighting unit and/or of the connection to a solenoid-operated shutter of the camera, as described in the Moore application above mentioned. It contains the insulating blocks 23 which carry the various electrical contacts and conductors of the battery case unit, as also described in said application.

At its upper end the battery case carries a reflector supporting bracket 25 to which a conventional reflector 26 may be secured by a screw 27 and knurled nut 28.

As previously indicated, the conventional flashlamp battery case is adapted to hold two or three dry-cell batteries for powering the flashlamp and any side lighting units employed, and for actuating the shutter of the camera. The present invention provides a battery-capacitor cartridge which may be slipped into the conventional battery case in place of the dry-cell batteries to power the flashlamp and the other named devices.

The cartridge comprises a battery carrier 30 for holding a conventional, say 22½ volt, flat, type battery B. This carrier is made of brass or other suitable conducting alloy, and has a generally circular base 31. Two spring arms or extensions 32 which project from the base are adapted to resiliently hold the battery B in the carrier. Tangs 34 are struck inwardly and downwardly from the two arms 32 of the carrier to retain against the base 31 a plate 35. This plate is made of an insulating material such as a phenolic sheet, and has a semi-conducting surface on one side. It is assembled in the carrier with its conducting surface upward.

The carrier is adapted to be assembled in a cylindrical housing 40 made of an insulating plastic and open at both ends. The housing is molded with internal ribs 42 for engaging the arms or extensions 32 of the carrier 30 to prevent rotation of the carrier in the housing. The housing is provided with a slot 45 which extends upwardly some distance from the bottom of the housing as shown in Fig. 4.

Mounted in the housing to be supported therein by the battery B is a second carrier 50 for a conventional capacitor C. The capacitor may, of course, be of any suitable size. With the 22½ volt battery B a 250 mf., 25 volt D. C. capacitor may, for instance, be used. The second carrier 50 is made of strip brass or other suitable conducting alloy which is formed with parallel sides 51 and 52 that are connected at their upper ends by upwardly converging top portions 53 and 54 which converge to a peak 55. The capacitor is adapted to be held resiliently between the parallel sides 51 and 52 of the carrier with one of its terminals 57 normally spaced slightly below the peak portion 55 of the carrier. To hold a capacitor firmly in position, the arms 51 and 52 are bent inwardly toward one another intermediate their ends, as denoted at 59 and 60 to provide a support or rest on which the capacitor seats. Below the supporting bends 59 and 60, the portions 61 and 62 of the arms 51 and 52 converge toward one another, and the side strap 51 is formed with a base portion 63 that has a tongue 65 which is adapted to engage in a notch 66 in the portion 62 to lock the carrier 50 around the capacitor. The portion 63 is formed with a recess 67 (Fig. 6) adapted to fit over the upper terminal 68 of the battery B. The lower terminal 69 of the battery seats against the conducting upper side surface of the plate 35. The lower terminal 71 of the capacitor C is connected by an insulated lead wire 73 with the conducting side of the plate 35, this wire being securely retained in electrical contact with the plate by one of the ears 34 of the carrier 30 which is bent down over it.

In assembling the cartridge, the plate 35 is positioned on the base 31 of the lower carrier 30 with its conducting surface up; and the battery B is positioned between the two resilient arms 32 of this lower carrier with its lower terminal 69 in contact with the conducting surface of the plate 35. The upper carrier 50 may then be placed on top of the battery B with the capacitor C inserted therein and with the recess 67 of the carrier seated on upper terminal 68 of the battery. The conductor wire 73, which may be soldered at its upper end to the lower terminal 71 of the capacitor may then be secured in electrical contact with the upper conducting surface of plate 35 by pressing downwardly on one ear 34 of the lower carrier 30. The two carriers, with the capacitor and battery mounted therein, may then be shoved into the cylindrical housing 40. If the cartridge is to be used in a conventional battery case that has a capactiy only for two conventional, cylindrical dry-cell batteries, the housing is then shoved into the bottom of the battery case. Then the cap 21 is threaded on the battery case so that the spring 80, which is housed in the cap, engages the base 31 of the lower carrier 30 to press the whole assembly upward so that the ridge portion 55 of the upper carrier engages the contact which serves to conduct the current to the flashlamp and to the outlets of the battery case. Since one terminal 69 of battery B is connected through the conducting coating of plate 35 and through conductor 73 with one terminal of capacitor C, and since the other terminal 57 of the capacitor is connected through straps 51 and 52 with the other terminal 68 of the battery, and since terminal 68 of the battery is grounded by arms 32, base 31 and spring 80 to the battery case 20, and since the terminal 57 of the capacitor C is connected by arms 51 and 52 and ridge 55 resiliently with the connecting unit of the battery case, it will be seen that when the cartridge is in position in the battery case, the battery and capacitor are connected in parallel with the battery case connecting unit.

Where the cartridge is to be used in a battery case that normally holds three cylindrical dry-cell batteries, a spacer (Fig. 4) is used between the cartridge and the connecting blocks of the battery case unit. This spacer comprises a cylindrical wooden block 90, which is bored centrally to receive a contact member 92. This contact member may be in the form of a conventional round head brass fastener long enough to extend through the block 90 and to have its ends bent as shown at 93 in Fig. 8 to hold it in the block. This fastener then acts as a conductor. It is adapted to be interposed between the ridge 55 of the upper carrier 50 and the contact 82 of the battery case connecting unit so that the bent ends of the fastener engage the ridge portion 57, and the head 94 of the fastener engages the contact 82. The power of the B–C cartridge is then transmitted through conductor 92 and contact 82 to the flashlamp and/or side lighting units, and/or shutter depending what outlets 22, if any, of the battery case are plugged in.

To replace a battery B, the cartridge is removed from the battery case 20 and the capacitor-battery assembly is pushed down in housing 40 by pressing on ridge 55 until the battery is exposed in the slot 45 of the housing. Then the worn-out battery is removed through the slot 45, and a new battery is put in its place.

While the invention has been described in connection with a specific embodiment thereof, then, it will be understood that it is capable of further modification, and this application is intended to cover any variations, uses, or adaptations of the invention, following in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A removable cartridge for use as a powering means in the battery case of a photographic flash unit, comprising a tubular housing made of insulating material and open at both ends, a battery holder slidable axially in and out of said housing, and comprising a base and a pair of resilient arms projecting from said base and constructed and arranged to engage resiliently with opposite sides of a battery positioned in said holder, said battery holder having electrical connection with one side of said battery and being positioned in said housing so that its base is adjacent one open end of said housing, a capacitor holder slidable axially in and out of said housing and comprising a resilient electrically-conducting member having one end adjacent the other open end of said housing and having electrical connection with the other side of said battery and with one side of said capacitor, and means within said housing for electrically connecting the opposite side of said capacitor with said battery holder.

2. A removable cartridge for use as a powering means in the battery case of a photographic flash unit, comprising a tubular housing made of insulating material and open at both ends, a battery holder slidable axially in and out of said housing, said battery holder being made of electrically-conducting material and comprising a base and a pair of substantially parallel resilient arms projecting from said base and constructed and arranged to engage resiliently with opposite sides of a battery positioned in said holder and through said opposite sides to have electrical connection with one terminal of said battery, said holder being positioned in said housing so that its base is adjacent one open end of said housing, a capacitor holder slidable axially in and out of said housing and comprising a resilient, electrically conducting strap having a top portion positioned adjacent the other end of said housing and two resilient arms projecting from said top portion, the last-named arms having contact with opposite sides of a capacitor mounted in said capacitor holder and through the last-named sides being in electrical connection with one terminal of said capacitor, said last-named arms being formed to support said capacitor in said housing above said battery and to have contact with said one terminal of said battery, means connecting the other terminal of said capacitor with the other terminal of said battery, and means insulating said other terminal of said battery from said battery holder.

3. A removable cartridge for use as a powering means in the battery case of a photographic flash unit, comprising a tubular housing made of insulating material and open at both ends, a battery holder slidable axially in and out of said housing, said battery holder being made of electrically-conducting material and comprising a base and a pair of substantially parallel resilient arms projecting upwardly from said base and constructed and arranged to engage resiliently with opposite sides of a battery positioned in said holder and through said opposite sides to have electrical connection with one terminal of said battery, said holder being positioned in said housing so that its base is adjacent one open end of said housing, a capacitor holder slidable axially in and out of said housing and comprising a resilient, electrically conducting strap having a top portion positioned adjacent the other end of said housing and two resilient arms projecting downwardly from said top portion, the last-named arms having contact with opposite sides of a capacitor mounted in said capacitor holder and through the last-named sides being in electrical connection with one terminal of said capacitor, said last-named arms being formed to support said capacitor in said housing above said battery and to have contact with said one terminal of said battery, an insulating disc positioned between said battery and the base of said battery holder to insulate the other terminal of said battery from said battery holder, said insulating disc having electrical conducting material on the face of said disc which is opposed to said other terminal of said battery, and said electrical conducting material being in contact with said other terminal of said battery, and an electrical conductor connecting said electrical conducting material with the other terminal of said capacitor.

4. A removable cartridge for use as a powering means in the battery case of a photographic flash unit, comprising a tubular housing made of insulating material and open at both ends, a battery holder slidable axially in and out of said housing, said battery holder being made of electrically-conducting material and comprising a base and a pair of substantially parallel resilient arms projecting upwardly from said base and constructed and arranged to engage resiliently with opposite sides of a battery positioned in said holder and through said opposite sides to have electrical connection with one terminal of said battery, said holder being positioned in said housing so that its base is adjacent one open end of said housing, a capacitor holder slidable axially in and out of said housing and comprising a resilient, electrically conducting strap having a top portion positioned adjacent the other end of said housing and two resilient arms projecting downwardly from said top portion, the last-named arms having contact with opposite sides of a capacitor mounted in said capacitor holder and through the last-named sides being in electrical connection with one terminal of said capacitor, said last-named arms being formed to support said capacitor in said housing above said battery and to have contact with said one terminal of said battery, an insulating disc positioned between said battery and the base of said battery holder to insulate the other terminal of said battery from said battery holder, said insulating disc having electrical conducting material on the face of said disc which is opposed to said other terminal of said battery, and said electrical conducting material being in contact with said other terminal of said battery, and an electrical conductor connecting said electrical conducting material with the other terminal of said capacitor, said housing having an elongate slot in one side extending from said one end of said housing toward said other end thereof and through which a battery may be inserted into or removed from said battery holder.

5. A removable cartridge for use as a powering means in the battery case of a photographic flash unit, comprising a tubular housing made of insulating material and open at both ends, a battery holder slidable axially in and out of said housing, said battery holder being made of a resilient electrically-conducting material and comprising a base and a pair of substantially parallel arms projecting upwardly from said base and constructed and arranged to resilently hold a battery therebetween to have electrical connection with one terminal of said battery, said holder being positioned in said housing so that its base is adjacent one open end of said housing, a capacitor holder slidable axially in and out of said housing and comprising a resilient electrically-conducting strap shaped to have a top portion and two arms projecting downwardly therefrom, said top portion being positioned adjacent the other open end of said housing and being ridge-shaped to have resilient electrical contact with an electrical contact positioned thereabove in said case, the last-named arms holding a capacitor resiliently therebetween to have electrical connection with one terminal of said capacitor, said last-named arms being bent toward one another intermediate their ends to support said capacitor above said battery, one of said last-named arms being bent below its supporting portion to have electrical contact with said one terminal of said battery, said last-named arms having a tongue and slot connection at their free ends to releasably lock said capacitor therebetween, an insulating disc positioned between said battery and said base to insulate the other terminal of said battery from said battery holder, said insulating disc having its face adjacent said other terminal of said battery coated with an electrical conducting material, an electrical conductor connecting the other terminal of said capacitor with the last-named electrical conducting material, and an ear pressed out of one arm of said battery holder to hold said conductor resiliently in engagement with said last-named electrical conducting material.

References Cited in the file of this patent

UNITED STATES PATENTS

| 2,590,069 | Robinson | Mar. 18, 1952 |
| 2,685,668 | Ameele et al. | Aug. 3, 1954 |